US011999580B2

(12) United States Patent
Gracia Verdugo et al.

(10) Patent No.: US 11,999,580 B2
(45) Date of Patent: Jun. 4, 2024

(54) VARIABLE WEB TENSIONING

(71) Applicant: HEWLETT-PACKARD DEVELOPMENT COMPANY, L.P., Spring, TX (US)

(72) Inventors: Antonio Gracia Verdugo, Sant Cugat del Valles (ES); Josep Maria Bel Calavia, Sant Cugat del Valles (ES); Andreu Vinets Alonso, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 132 days.

(21) Appl. No.: 17/756,012

(22) PCT Filed: Dec. 4, 2019

(86) PCT No.: PCT/US2019/064361
§ 371 (c)(1),
(2) Date: May 13, 2022

(87) PCT Pub. No.: WO2021/112835
PCT Pub. Date: Jun. 10, 2021

(65) Prior Publication Data
US 2022/0388800 A1 Dec. 8, 2022

(51) Int. Cl.

| | |
|---|---|
| ***B65H 23/18*** | (2006.01) |
| ***B41J 11/00*** | (2006.01) |
| ***B41J 15/16*** | (2006.01) |
| ***B65H 23/195*** | (2006.01) |

(52) U.S. Cl.
CPC ........ *B65H 23/1955* (2013.01); *B41J 11/002* (2013.01); *B41J 15/165* (2013.01)

(58) Field of Classification Search
CPC .............. B65H 23/188; B65H 23/1888; B65H 23/195; B65H 26/04; B41J 11/002; B41J 15/165; B41L 23/20; B41F 33/16; B41F 23/04
USPC ...................... 270/1.01; 242/334, 334.6, 413
See application file for complete search history.

(56) References Cited

U.S. PATENT DOCUMENTS

| | | | | |
|---|---|---|---|---|
| 3,220,347 A | | 11/1965 | Luehrs | |
| 5,623,288 A | | 4/1997 | Thomas et al. | |
| 6,053,107 A | * | 4/2000 | Hertel | B41F 13/025 101/220 |
| 6,659,006 B2 | * | 12/2003 | Brennan | B65H 23/188 250/548 |

(Continued)

FOREIGN PATENT DOCUMENTS

| | | |
|---|---|---|
| EP | 1317345 B1 | 8/2007 |
| JP | 2018171750 | 11/2018 |
| WO | WO-02022371 | 3/2002 |

*Primary Examiner* — Leslie A Nicholson, III

(57) ABSTRACT

A system (300) is provided having a printer (4) to print printing liquid onto a web (6) of media (8). The system (300) has a winding roller (10) on which to roll the web (6) of media (8) after printing. A tensioner (12) to vary the tension in a portion (14) of the web (6) of media (8) is also provided. The portion (14) is a portion of web which is being rolled onto the winding roller (10). Also provided is controller (16) to control the tensioner (12) to vary the tension based on the time taken for the printed printing liquid on the web (6) of media (8) to dry.

12 Claims, 4 Drawing Sheets

(56) References Cited

U.S. PATENT DOCUMENTS

| | | | | |
|---|---|---|---|---|
| 6,813,941 | B2 * | 11/2004 | Beuther | G01L 5/042 73/159 |
| 8,814,313 | B2 | 8/2014 | Leighton et al. | |
| 8,998,370 | B2 | 4/2015 | Studer et al. | |
| 2002/0083854 | A1 | 7/2002 | Brennan et al. | |
| 2003/0115946 | A1 | 6/2003 | Beuther et al. | |
| 2015/0239234 | A1 | 8/2015 | Regelsberger et al. | |

* cited by examiner

VARIABLE WEB TENSIONING

BACKGROUND

Web-fed printing devices are commonplace and can be found, for example, in industrial or retail printing environments. Web-fed refers to the webs, or rolls, of media, being fed into the printing devices and are distinguishable from sheet-fed printers. Sheet-fed refers to individual sheets of media being fed into the printing device. The media can include paper, polymeric materials, or other media adapted for printing. Sheet-fed printing devices offer the advantages of being configurable for different format sizes and waste sheets can be reused for testing, which can lead to flexibility and lower cost print preparation. Web-fed printing devices, however, provide much faster printing than sheet-fed devices. The speed of web-fed printing devices makes them ideal for large runs such as newspapers, magazines, and books.

The output from a web-fed printing device can be cut in to sheets and collated for use in newspapers, for example. Alternatively, the output can be retained in web form and rolled on to a winding roller rather than cut in to sheets. The printed media may then be stored as a roll or web of media for subsequent processing, for example, cutting into sheets.

BRIEF DESCRIPTION OF THE DRAWINGS

Some non-limiting examples of the present disclosure will be described in the following with reference to the appended drawings in which.

DETAILED DESCRIPTION

In the following detailed description, reference is made to the accompanying drawings which form a part hereof, and in which is shown by way of illustration specific examples in which the disclosure may be practiced. It is to be understood that other examples may be utilised and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Figure 1:
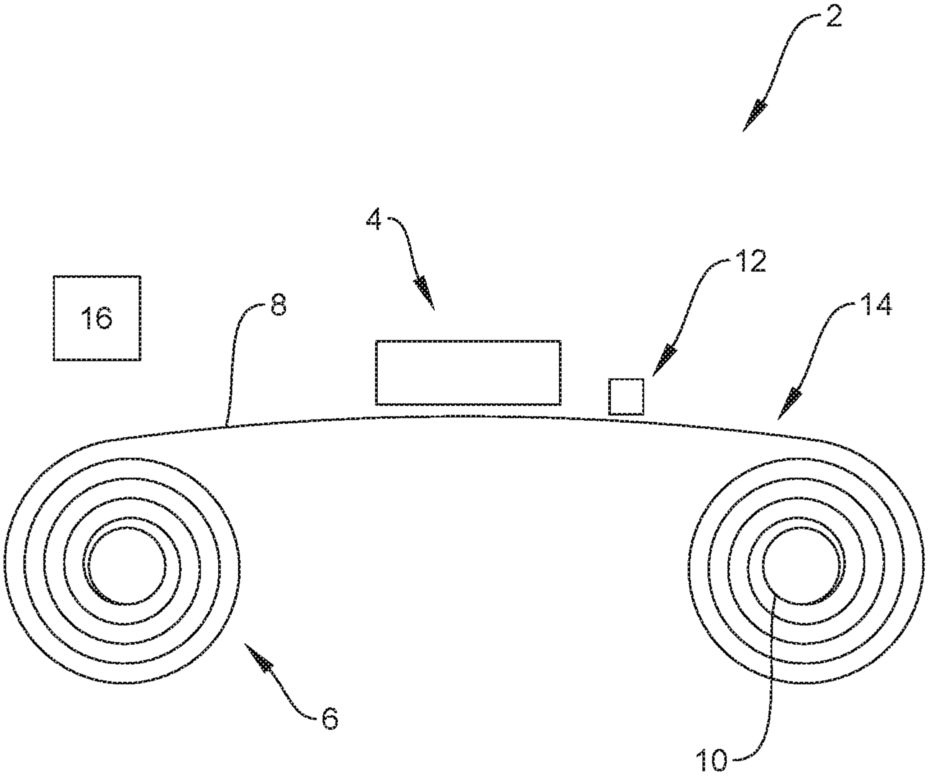
FIG. 1 is a schematic view of a first system in accordance with an example.

In FIG. 1, a system 2 is shown having a printer 4 to print ink onto a web 6 of media 8 and a winding roller 10 on which to roll the web 6 of media 8 after printing. The system 2 also has a tensioner 12 to vary the tension in a portion 14 of the web 6 of media 8 which portion 14 is being rolled onto the winding roller 10. Furthermore, the system 2 has a controller 16 to control the tensioner 12 to vary the tension based on the time taken for the printed ink on the web 6 of media 8 to dry.

The proper winding of the web 6 of media 8 onto the winding roller 10 can be adversely affected if the media 8 is wet. If the media 8 is wet as it is wound onto the winding roller 10, then a cockling of the media 8 (i.e. a wave in the media) can develop and become present in the media 8 wound on the winding roller 10. This results in the air becoming trapped between wound layers of media 8 and poor compactness of media 8 on the winding roller 10. This is avoided or reduced in the present example by having regard to the time taken for the printed ink on the web 6 of media 8 to dry. Based on this, the controller 16 controls the tensioner 12 to vary the tension in the web 6 of media 8 and, in that way, pull the media 8 towards a less cockled condition.

The controller 16 is configured to vary the tension in the web 6 of media as the web 6 of media 8 is rolled on to the winding roller 10. So, if the time taken for the printed ink on the web 6 of media 8 to dry changes, then the controller 16 will control the tensioner 12 to make an appropriate change to the tension. The time taken for the printed ink to dry might change for numerous reasons. For example, environmental or ambient conditions (temperature and humidity) might change, and this will affect the rate at which printed ink on the web 6 of media 8 dries. Changes in any heating/drying capability in the system 2 will affect the rate at which printed ink on the web 6 of media 8 dries. Also, the density (or amount per unit area of media 8) of printed ink on the web 6 of media 8 affects the rate at which the printed ink dries. The time taken for the printed ink to dry can change at various stages during a printing run and so changes to the tension are made (to promote proper winding) by the controller 16 while the web 6 of media 8 is being printed.

The controller 16 is configured to vary the tension in the web 6 of media 8 by increasing the tension with an increase in the time taken for printed ink on the web 6 of media 8 to dry. If the time taken for printed ink on the web 6 of media 8 to dry increases, then an assumption can be made that the portion 14 of media 8 being rolled onto the winding roller 10 will be wetter and susceptible to greater cackling. Therefore, an increase in the tension will avoid or reduce the cackling. This is achieved as a result of the increased tension making the media 8 more taut and therefore pulling the media into a flat condition as opposed to a wavy (cockled) condition that would otherwise exist.

The controller 16 is configured to receive data relating to the rate at which ink is received by the web 6 of media 8 during printing and data relating to the rate at which the ink dries when received by the web 6 of media 8. With this data, the controller can make a determination regarding the time taken for the printed ink on the web 6 of media 8 to dry.

The controller 16 is configured to calculate a drying parameter based on the ink drying characteristics of the web 6 of media 8 and on the ink drying characteristics of the printer 4. The controller 16 is configured to calculate a drying parameter based on the ink drying characteristics of the ink.

The controller 16 is configured to calculate a drying parameter based on ambient temperature and humidity.

The drying parameters are used by the controller 16 to determine the time taken for the printed ink on the web 6 of media 8 to dry.

In the system 2, the controller 16 is configured to vary the tension in the web 6 of media 8 when the rate at which ink is received by the web 6 of media 8 during printing is greater than the rate at which the ink dries when received by the web 6 of media 8; and the controller 16 is configured to vary the tension in the web 6 of media 8 by increasing the tension as the difference between the rates increases. If the rate at which ink is received by the web 6 of media 8 (i.e. the ink flux) during printing is less than the rate at which the ink dries when received by the web 6 of media 8, then the ink dries immediately as it is received by the web 6 of media 8. In this instance, no additional tension in the media 8 is provided to avoid cockling arising from wet media. If the rate at which ink is received by the web 6 of media 8 during printing is greater than the rate at which the ink dries when received by the web 6 of media 8; then the ink does not dry immediately but remains wet for a period of time. If the amount by which the ink flux is greater than the drying rate increases (i.e. the difference between the rates increases); then the controller 16 determines that the time taken for the printed ink on the web 6 of media 8 to dry also increases. As a consequence, the controller 16 controls the tensioner 12 to increase tension to deal with the increased likelihood of greater cockling.

The rate at which ink is received by the web 6 of media 8 during printing is calculated by the controller 16 based on ink ejection data indicating the rate at which drops of ink are ejected by the printer 4 per unit area of media 8. This calculation can assume that all ejected ink is received by the web 6, as intended.

The system 2 further has a densitometer 24 which communicates ink ejection data to the controller 16. The rate at which ink is received by the web 6 of media 8 (i.e. the ink flux) during printing can be determined from the ink ejection data (e.g. indicating the amount (such as volume or weight) of ink ejected by the printer 4 per unit area of media 8).

The system 2 is a roll to roll printing system.

Figure 2:
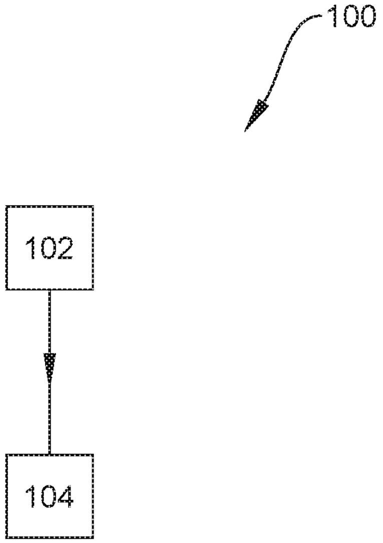
FIG. 2 is a flow chart of a method in accordance with an example.

In an example shown in FIG. 2, a method 100 is provided to wind a printed web of media onto a winding roller 10. The method 100 includes determining 102 a wetness parameter based on the ink wetness of a portion 14 of media web 6, which portion 14 is being rolled on to the winding roller 10; and based on the wetness parameter, varying 104 the tension in the portion 14 of the media web 6 as the portion 14 is being rolled onto the winding roller 10.

The wetness parameter provides a quantitative indication of how wet the printed ink is on the web 6 of media 8. The wetness of a particular portion 14 of media web 6 is assessed. Specifically, a portion 14 which is being rolled on to the winding roller 10 is assessed, because the printed ink on this portion 14 no longer has time to dry any further before it is wound on to the winding roller 10. If this portion 14 of media web 6 is sufficiently wet for it to be susceptible to becoming cockled (or to be already cockled) as a result, then proper winding of the portion 14 of media web 6 onto the winding roller 10 will not likely be possible without tension in the portion 14 being appropriately set (i.e. adjusted to an appropriate level) before the portion 14 is wound on to the winding roller 10. Therefore, the wetness parameter allows a determination to be made about the tension to be applied to the portion 14.

In the method, the wetness parameter is determined based on data relating to the rate at which ink is received by the web 6 of media 8 during printing and data relating to the rate at which the ink dries when received by the web 6 of media 8.

The data relating to the rate at which the ink dries includes ink drying characteristics of the web 6 of media 8 and ink drying characteristics of the printer 4.

The tension in the web 6 of media 8 is varied when the rate at which ink is received by the web 6 of media 8 during printing is greater than the rate at which the ink dries when received by the web 6 of media 8; and the tension in the web 6 of media 8 is varied by increasing the tension as the difference between the rates increases.

Another example provides a non-transitory computer-readable medium having instructions, which when executed on a computing device, cause the computing device to determine a drying parameter based on the time taken for printed ink to dry on a portion of a web of media, which portion is being rolled on to a winding roller; and based on the drying parameter, operate a tensioner to vary the tension in the portion of the web of media as the portion is being rolled onto the winding roller.

The controller 6 shown in FIG. 1 can comprise computing device.

Figure 3:
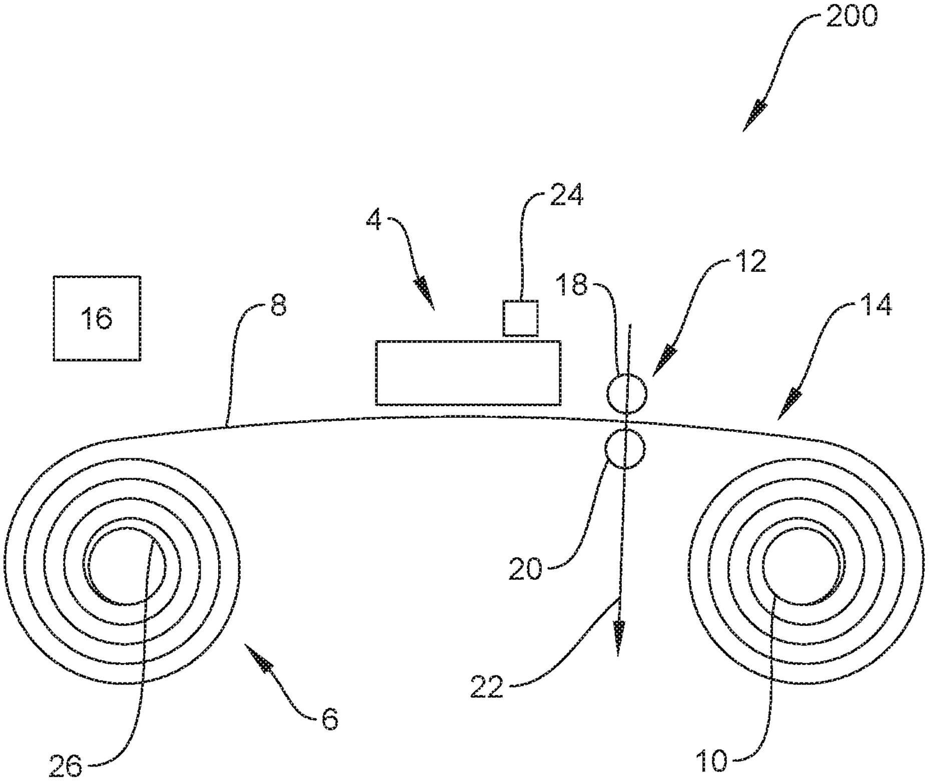
FIG. 3 is a schematic view of a second system in accordance with an example.

An example of another system 200 is shown in FIG. 3. Like features between system 2 of FIG. 1 and system 200 of FIG. 3 are referred to herein with like reference numerals.

The tensioner 12 of the system 200 shown in FIG. 3 has two rollers 18,20 between which the web 6 of media 8 is located. The two rollers 18,20 move in a direction indicated by arrow 22 in FIG. 3 to increase tension in the portion 14 of the web 6 of media 8. However, it will be apparent to a skilled reader that an alternative arrangement to the two rollers 18,20 may be provided for varying the tension in the portion 14 of the web 6 of media 8. For example, one roller 18 alone (without a second roller 20) can be used.

The system 200 has a densitometer 24 which is used in providing data to determine the ink flux. The operation of a densitometer is known in the art and allows the amount of ink fired/ejected per unit area of media to be determined. This may be through pixel counting or density counting, for example.

Figure 4:
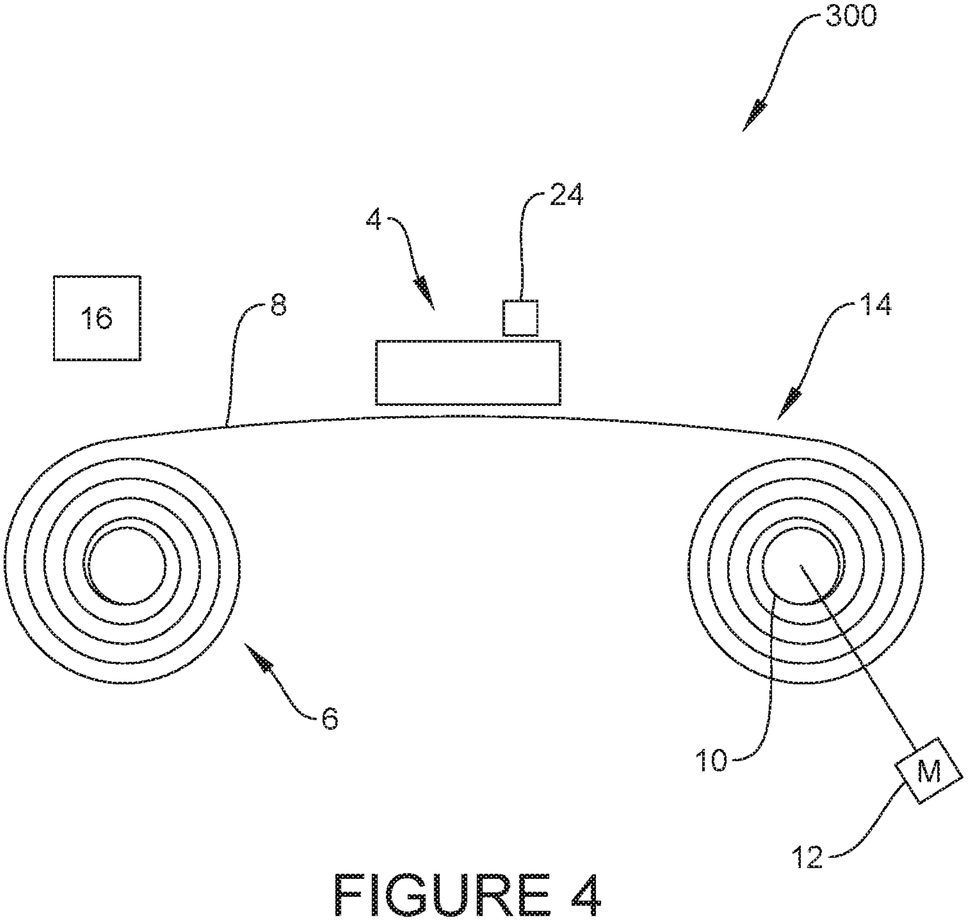
FIG. 4 is a schematic view of a third system in accordance with an example.

An example of another system 300 is shown in FIG. 4. Like features between system 200 of FIG. 3 and system 300 of FIG. 4 are referred to herein with like reference numerals.

The tensioner 12 of the system 300 shown in FIG. 4 is provided by way of a drive motor M driving the winding roller 10. If additional tension is to be provided, then electric current to the drive motor M is adjusted so as to increase the motor torque and thereby place the media 8 under increased tension.

A significant component of the tension in portion 14 of media web 6 is the tension resulting from the changing radius of the media web on the winding roller 10 as the media 8 is wound on to the winding roller 10. Another component of the tension in portion 14 arises from tension applied by the input (front) roller 26, on which the web 6 of media 8 is originally wound and stored prior printing. Further components of the tension in portion 14 arise from friction and inertia in the rollers and the motors. These components contribute to a target parameter relating to electric current to be applied to the drive motor M driving the winding roller 10.

This target parameter is represented by the following algorithm:

$$I_{target}=I_{FT}+I_{JR}+I_{Jm}\pm I_{Friction}$$

Where FT relates to front roller tension, JR to roll inertia, Jm to motor inertia and lastly Friction for all the terms that have more to do with the characteristics of the roll of paper.

The amount of ink printed per unit area of media (e.g. paper) modifies the characteristics of the media and, as discussed above, influences the drying time of the printed ink and the likelihood of cockling. When avoiding or reducing cockling by varying tension in the media, the above target parameter is represented by the following modified algorithm:

$$I_{target}=I_{FT}+I_{JR}+I_{Jm}\pm I_{Friction}\pm I_{drying}$$

Where drying relates to the abovementioned drying parameter (or wetness parameter).

For illustration purposes, the following function represents current associated with the drying parameter:

$$I_{drying} = R \cdot K_{tension} \cdot \frac{\text{Ink}_{flux} - (D_{system} + D_{paper}) * THR}{K_m \cdot n \cdot \eta}$$

Where:

$\text{Ink}_{flux}$ (Fired/ejected ink flux)

$D_{system}$ (System drying constant)

$D_{paper}$ (Paper drying capacity constant)

THR (Ambient temperature and humidity conditions constant)

$K_{tension}$ (Converts the amount of ink into additional tension needed in the media)

R (Radius, converts the tension into a torque)

Km (Motor constant, converts the torque at the drive motor)

n (Transmission ratio, converts the torque at the winding roller to the torque at the drive motor)

η (Transmission efficiency)

Since $K_{tension}$, Km, n and η are constant for a given product, they can be combined as a single constant, $K_{drying}$ as below:

$$K_{drying} = \frac{K_{tension}}{K_m \cdot n \cdot \eta}$$

The function for current associated with the drying parameter is thereby reduced to:

$$I_{drying} = R \cdot K_{drying} \cdot (Ink_{flux} - (D_{system} + D_{paper}) * THR)$$

This illustrates that the additional tension as a result of the time taken for printed ink on the web of media to dry (or the ink wetness of the media web) is dependent on ambient temperature and humidity, and the system and paper drying characteristics on the one hand, and the rate at which ink is received by the web of media during printing on the other hand. So, once the additional tension is determined, the additional torque can be determined. This is done having regard to the radius of the media web on the winding roller 10 by means of the R parameter, and the additional current ($I_{drying}$) at the drive motor, which drives the winding roller 10, is calculated taking into account system characteristics (such as the transmission and motor) by means of the $K_{tension}$ constant.

In an example, the system 300 has the following parameters:

$K_{tension}$=0.01 N*s/gsm

Km=49 Nm/mA n=50

η=0.75

Experimentation has shown that, for such a system, if the printing conditions are as listed below, then the tension in the media should be increased by around 20% to achieve proper winding of the media onto the winding roller.

$\text{Ink}_{flux}$=30 gsm/s (grams per second)

$D_{system}$=2.5 gsm/s—considering airflow, temperature and speed $D_{paper}$=10 gsm/s—considering weight and media/paper coating THR=1—non-dimensional factor applied for standard ambient conditions of 20 celsius and 40 relative humidity R=0.12 m The 20% increase is an increase in the tension which achieves proper winding (compact winding) when the ink flux is 15 gsm/s.

In a further example, the additional tension to achieve proper winding is determined with reference to yet further characteristics/parameters to those mentioned above. For example, further characteristics/parameters include a per colour media or paper diffusion rate, and evaporation ratios per colour.

In the above examples, ink is used as a printing liquid. However, any printing liquid can be used in the examples. Printing liquids include overcoats, and fixers, as well as ink. Printing liquids other than ink can be used in the above examples instead of ink.

Also, the amount of printing liquid (for example, ink) fired/ejected per unit area of media can be estimated prior to the commencement of the printing process by analysing the image to be printed. The tension to be added can then be determined, before printing has commenced, based on this density data and on the anticipated characteristics for the paper, printer, environment etc. described above.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited by the claims and the equivalents thereof.

The invention claimed is:

1. A system comprising:

a printer to print printing liquid onto a web of media;

a winding roller on which to roll the web of media after printing;

a tensioner to vary tension in a portion of the web of media that is being rolled onto the winding roller; and a controller to control the tensioner to vary the tension based on a time taken for the printing liquid printed on the web of media to dry, wherein the controller is configured to vary the tension in the web of media as the web of media is rolled onto the winding roller, and wherein the controller is further configured to vary the tension in the web of media by increasing the tension with an increase in the time taken for printed the printing liquid on the web of media to dry.

2. The system claimed in claim 1, wherein the controller is configured to receive data relating to a rate at which the printing liquid is received by the web of media during printing and data relating to a rate at which the printing liquid dries when received by the web of media.

3. The system claimed in claim 2, wherein the controller is further configured to calculate a drying parameter based on printing liquid drying characteristics of the web of media and on the printing liquid drying characteristics of the printer.

4. The system claimed in claim 3, wherein the controller is further configured to calculate a drying parameter based on ambient temperature and humidity.

5. The system claimed in claim 2, wherein the controller is further configured to vary the tension in the web of media when the rate at which the printing liquid is received by the web of media during printing is greater than the rate at which the printing liquid dries when received by the web of media; and wherein the controller is further configured to vary the tension in the web of media by increasing the tension as the difference between the rates increases.

6. The system claimed in claim 2, wherein the rate at which the printing liquid is received by the web of media during printing is calculated by the controller based on printing liquid ejection data indicating a rate at which drops of the printing liquid are ejected by the printer per unit area of the web media.

7. The system claimed in claim 6, further comprising a densitometer that communicates the printing liquid ejection data to the controller.

8. The system claimed in claim 1, wherein the system is a roll to roll printing system.

9. A method to wind a printed web of media onto a winding roller, the method comprising:

determining a wetness parameter based on a printing liquid wetness of a portion of the web of media that is being rolled onto the winding roller; and based on the wetness parameter, varying tension in the portion of the web of media as the portion is being rolled onto the winding roller, wherein the wetness parameter is determined based on data relating to a rate at which the printing liquid is received by the web of media during printing and data relating to a rate at which the printing liquid dries when received by the web of media.

10. The method claimed in claim 9, wherein the data relating to the rate at which the printing liquid dries includes printing liquid drying characteristics of the web of media and printing liquid drying characteristics of a printer.

11. The method claimed in claim 10, wherein the tension in the web of media is varied when the rate at which the printing liquid is received by the web of media during printing is greater than the rate at which the printing liquid dries when received by the web of media; and wherein the tension in the web of media is varied by increasing the tension as a difference between the rate at which the printing liquid is received by the web of media during printing and the rate at which the printing liquid dries when received by the web of media increases.

12. A non-transitory computer-readable medium comprising instructions, which when executed on a computing device, cause the computing device to:

determine a drying parameter based on a time taken for printed printing liquid to dry on a portion of a web of media that is being rolled onto the winding roller, based on a rate at which the printing liquid is received by the web of media during printing and data relating to a rate at which the printing liquid dries when received by the web of media; and based on the drying parameter, operate a tensioner to vary tension in the portion of the web of media as the portion is being rolled onto the winding roller.

* * * * *